United States Patent [19]
Lipscomb

[11] Patent Number: 6,095,387
[45] Date of Patent: Aug. 1, 2000

[54] MULTIPURPOSE CARRIER

[76] Inventor: Allen G. Lipscomb, 43385 Clark Rd., Pomeroy, Ohio 45769

[21] Appl. No.: 09/280,571

[22] Filed: Mar. 30, 1999

[51] Int. Cl.[7] .................................. B60R 9/06; B60R 9/10
[52] U.S. Cl. ...................... 224/485; 224/487; 224/521; 224/525; 224/526; 224/528; 224/924
[58] Field of Search ..................... 224/487, 485, 224/484, 521, 524, 525, 526, 527, 528, 924

[56] References Cited

U.S. PATENT DOCUMENTS

| | | | |
|---|---|---|---|
| 930,410 | 8/1909 | Noonan | 224/528 |
| 4,744,590 | 5/1988 | Chesney | 224/521 |
| 5,520,315 | 5/1996 | Graham | 224/924 |

*Primary Examiner*—Linda J. Sholl
*Attorney, Agent, or Firm*—Robert N. Blackmon

[57] ABSTRACT

A cargo carrier for attaching behind a vehicle to transport cargo, bicycles or the like, and which can easily be disassembled to a compact size. The cargo carrier is formed by a main support bar, and multiple top support rods and securing braces and fixed by two end pieces to form a platform for transporting cargo. A bicycle attachment can be secured to the cargo carrier to transport both cargo and bikes. Mud flaps and supplemental lighting can also be added, without the need for tools or complex accessories. Picnic table legs can be secured to a bottom portion of the carrier to form a picnic table from the carrier.

15 Claims, 9 Drawing Sheets

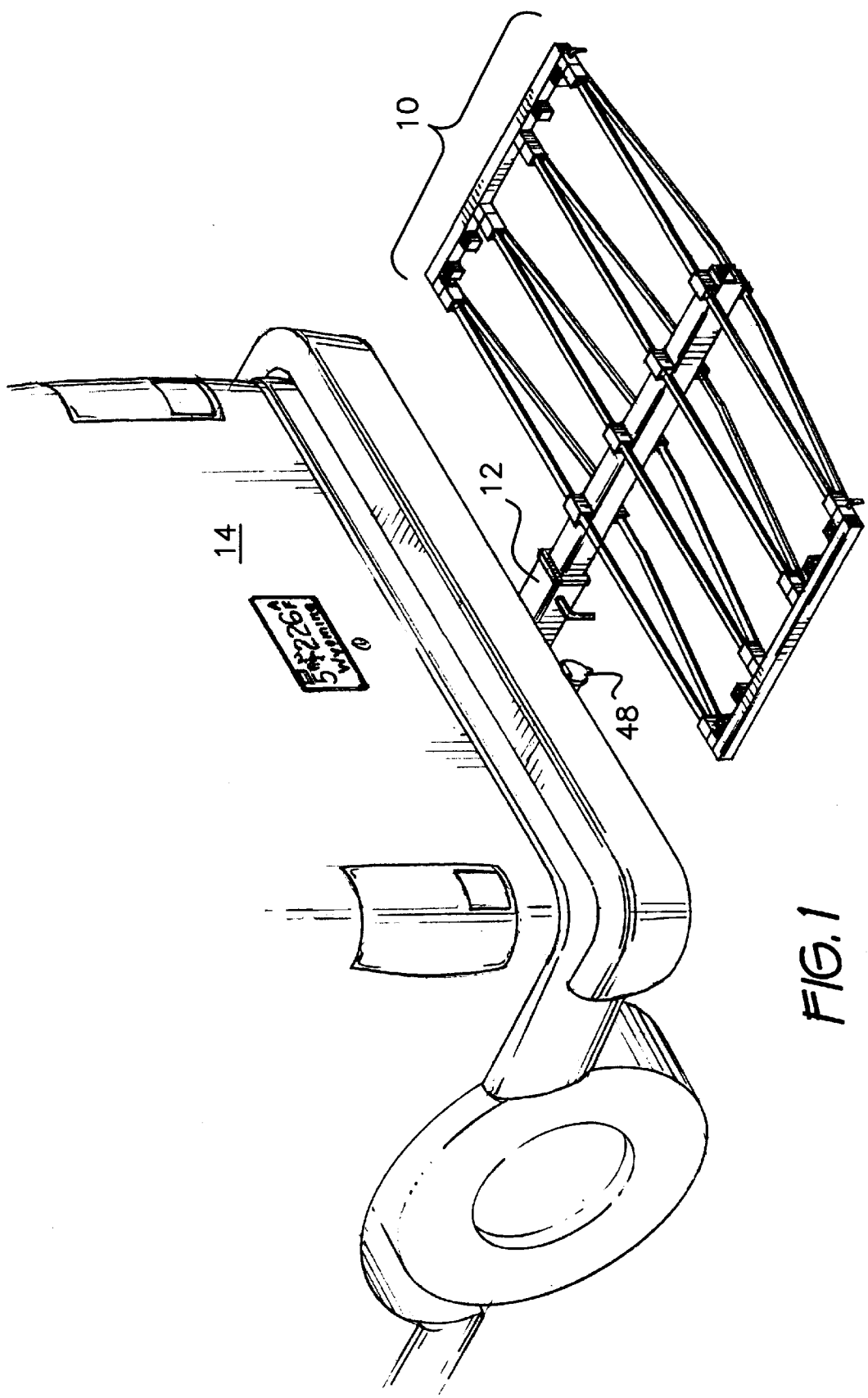

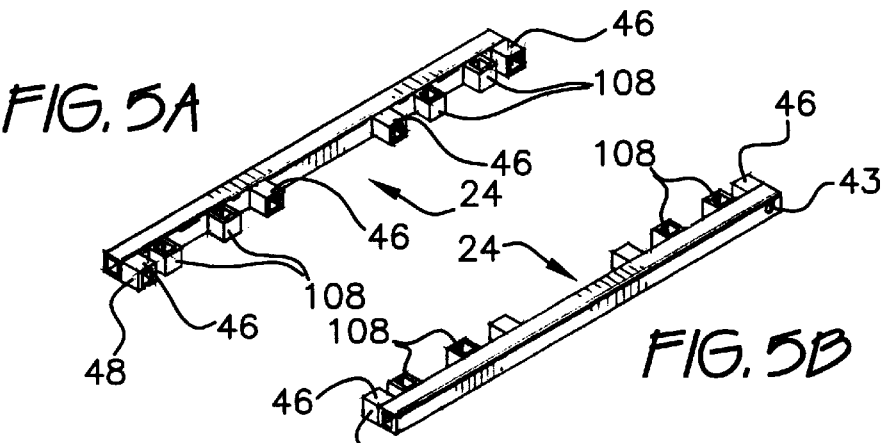
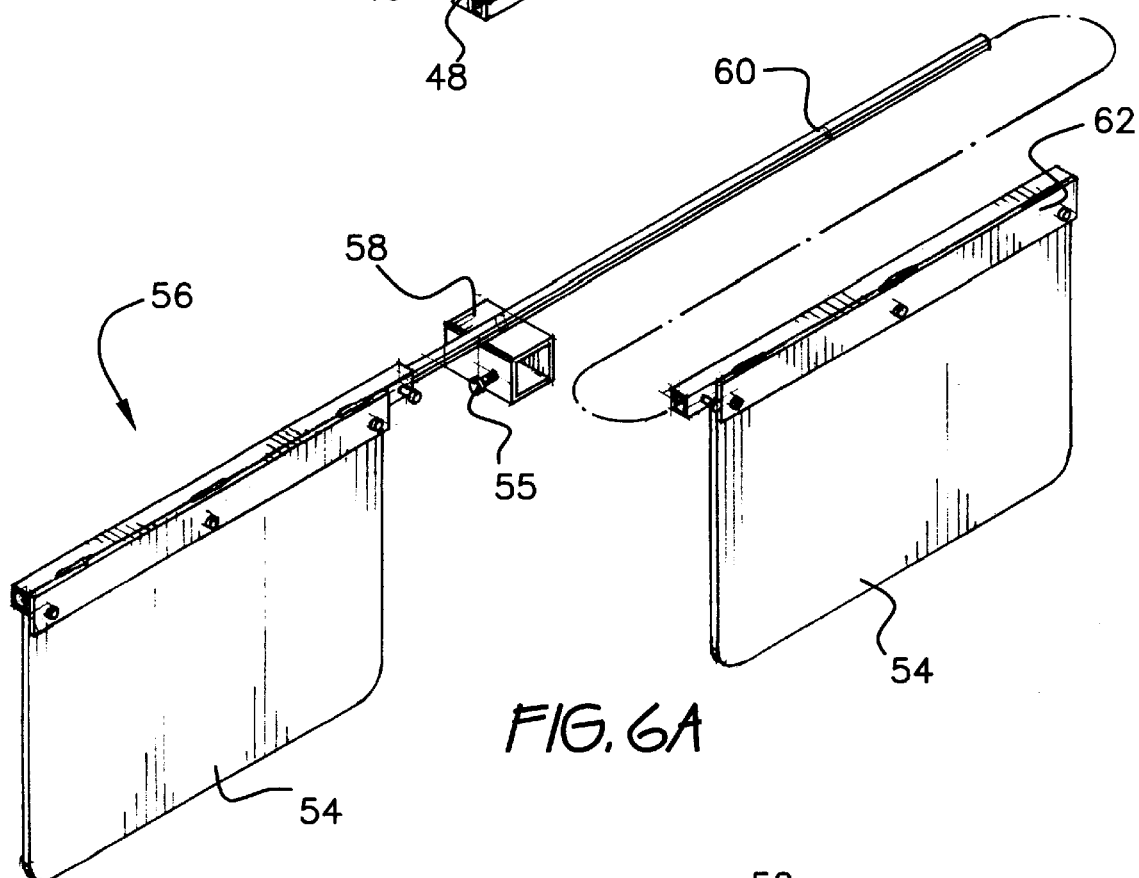
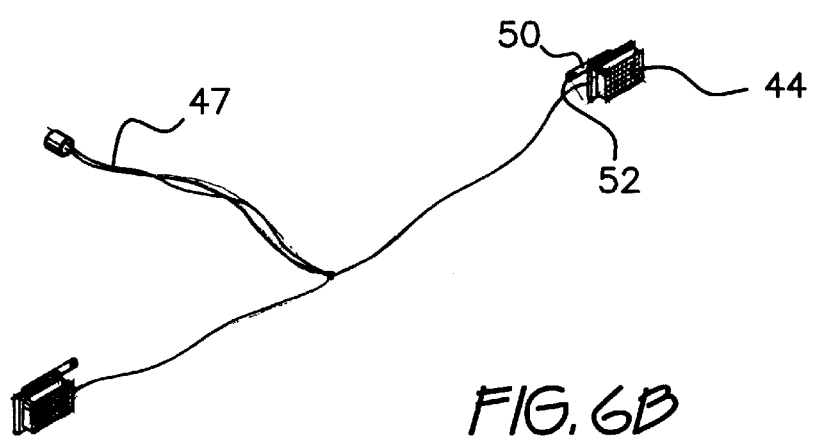

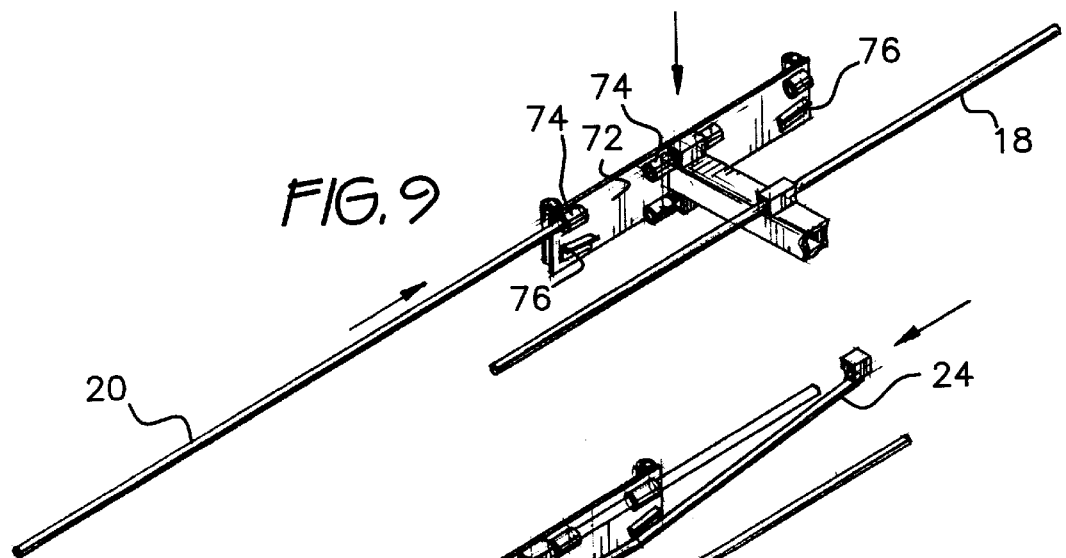
FIG. 9
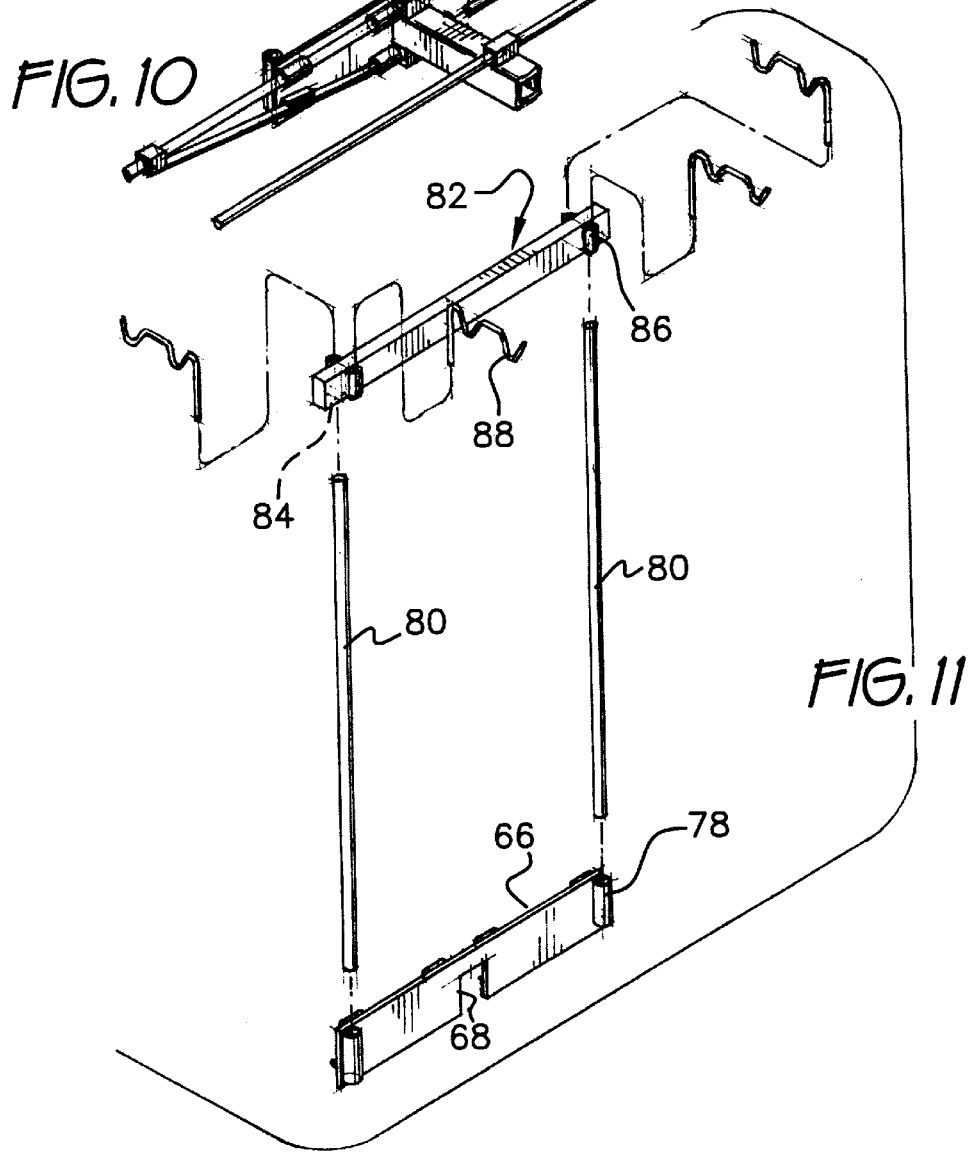
FIG. 10
FIG. 11

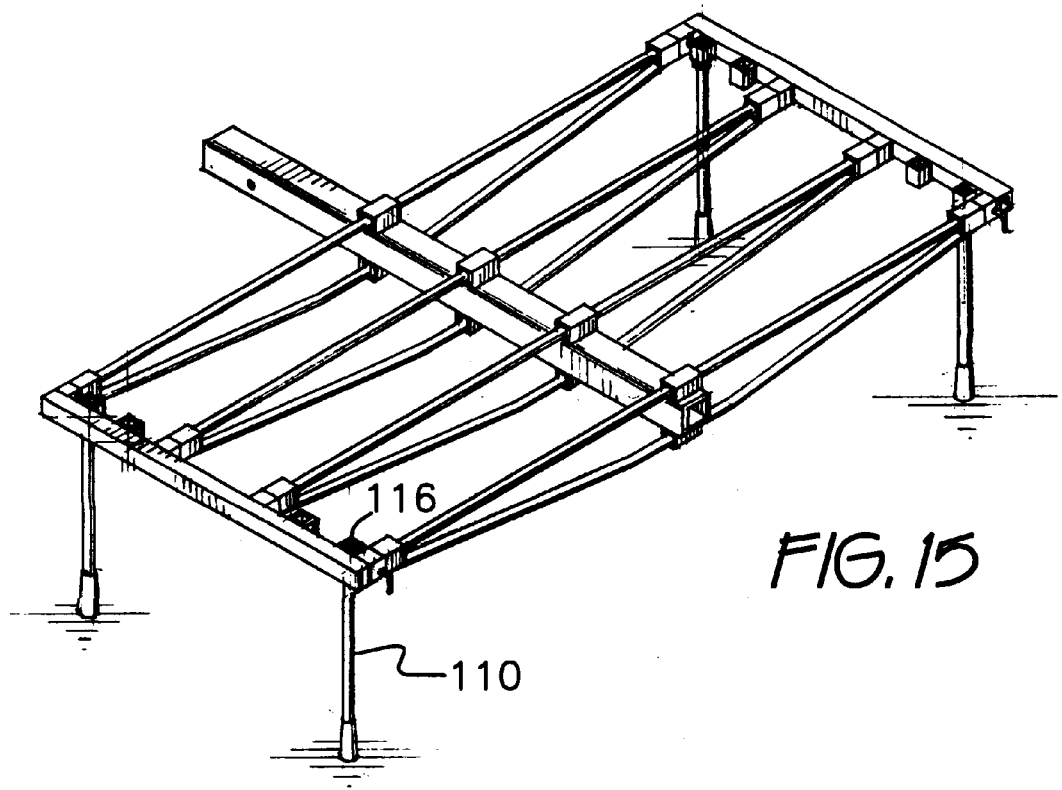
FIG. 15
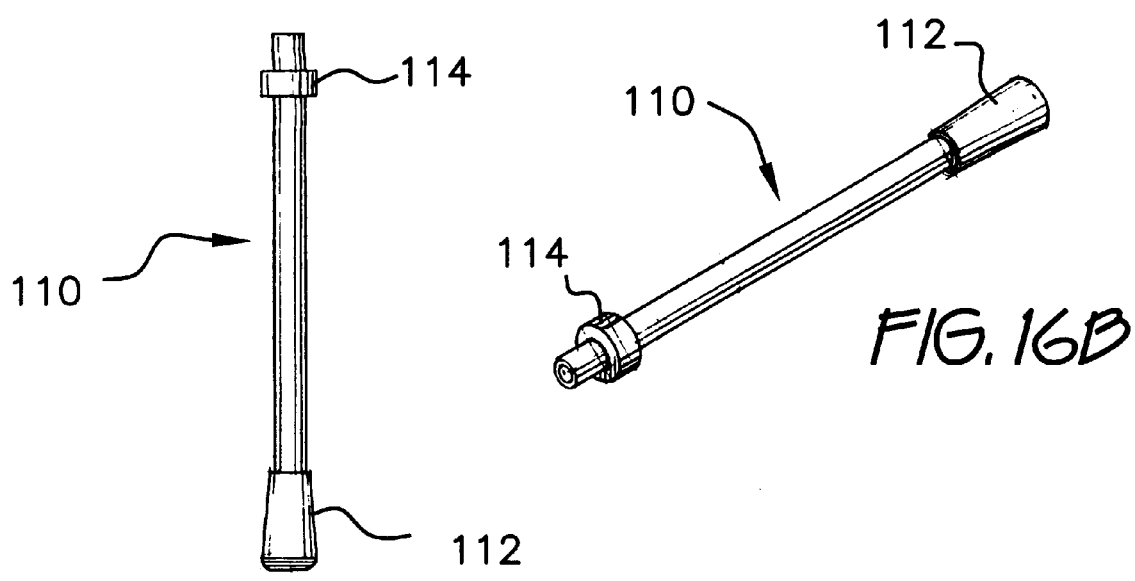
FIG. 16A
FIG. 16B

MULTIPURPOSE CARRIER

BACKGROUND OF THE INVENTION

1. Field of the Invention

The present invention relates to a carrier attachable to the receiver hitch of a vehicle, which is adaptable to carry bicycles or cargo and is easily disassembled to a compact stored state.

2. Description of the Prior Art

It is well known to provide a carrier for bicycles which can be attached to the rear of a vehicle. Most trucks and sport utility vehicles have a two inch receiver mounted to the back of the vehicle to receive a towing hitch or similar apparatus for towing trailers for boats or cargo. There are many bicycle carriers and other carriers that are adapted to be mounted to a vehicle by providing an adapter between the carrier and the receiver. The receiver provides a secure and stable mounting point for the carriers.

Examples of some of these carriers are shown in U.S. patents, include U.S. Pat. No. 5,460,304 to Porter et al. shows a modular carrier system which includes a plurality of pins, a cargo area and bike supports.

U.S. Pat. No. 3,794,227 to Steams shows a spaced, upright bike carrier which connects to the bumper of a vehicle.

U.S. Pat. No. 4,744,590 to Chesney shows a central square tope attached to the ball receiver of a vehicle and further having deployable ground support legs.

U.S. Pat. No. 4,813,584 to Wiley shows a cargo carrier which is received within and mounted to the receiver of a vehicle.

U.S. Pat. Nos. 4,906,015 to LaCroix, 5,067,640 to Gaskill and 5,586,702 to Sadler show other arrangements for vehicle mounted carriers.

U.S. Pat. No. 5,067,641 to Johnson et al. shows two bike carrying hooks on a horizontal beam attached to a hitch.

U.S. Pat. No. 5,377,886 to Sickler shows slidable bike supports for a bike carrier.

U.S. Pat. No. 5,497,927 to Peterson shows a carrier formed by a central beam, and transverse beams, and having pins are shown for connect various parts.

However a major drawback of the prior carriers is that they lack adaptability to handle various types of loads, and are large and bulky and difficult to store when removed from the vehicle. The carrier according to the present invention has taken a flexible, modular approach to the carrier design to allow different accessories to be added to the carrier to enhance the capacity of the carrier to carry cargo, bicycles, or other items. The carrier can also receive supplemental lights about its rear edge for additional safety and can be employed as a picnic table by installing optional legs to the bottom of the carrier. The modular build of the carrier also allows the entire base rack to be disassembled into its elemental pieces and stored in a case measuring 4 inches by 4 inches by 48 inches. The use of simple locking elements to secure the elements of the carrier together allow the entire rack to be assembled or disassembled without tools and in a minimal amount of time.

None of the above inventions and patents, taken either singly or in combination, is seen to describe the instant invention as claimed.

SUMMARY OF THE INVENTION

Accordingly, it is a principal object of the invention to provide a carrier which can be quickly assembled or disassembled to form a multi-purpose carrier.

It is another object of the invention to provide a carrier which can be secured to the receiver of a vehicle to provide a stable cargo platform for hauling materials behind the vehicle.

It is a further object of the invention to provide a carrier which can receive supplemental accessories including bike carrier attachments, additional brake or running lights, or mud flaps.

Still another object of the invention is to provide a carrier which can be removed from the vehicle and converted into a picnic table.

It is an additional object of the invention to provide a multi-purpose carrier which can be assembled without tools and disassembled to a compact form for storage or transportation.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an environmental view of the base carrier attached to the rear of a vehicle according to the invention.

FIGS. 5A & B are perspective views of the end pieces.

FIG. 6A is a perspective view of the mud flap components according to a second embodiment of the invention. FIG. 6B is a perspective view of the supplemental brake lights according to a third embodiment of the invention.

FIGS. 9 & 10 are perspective views of the assembly of the bike carrier onto the carrier base.

FIG. 11 is a exploded perspective view of the bike carrier assembly parts.

FIG. 15 is a perspective view of the picnic table configuration of the carrier according to a sixth embodiment of the invention.

FIG. 16A is a side elevational view of a table leg according to the sixth embodiment of the invention.

FIG. 16B is an environmental view of a table leg according to the sixth embodiment of the invention.

Similar reference characters denote corresponding features consistently throughout the attached drawings.

DETAILED DESCRIPTION OF THE PREFERRED EMBODIMENT(s)

The present invention as herein described with particular reference to the drawings is shown generally as cargo carrier 10 in Figures. The carrier 10 in its base embodiment is shown in FIG. 1 attached to the receiver ("trailer hitch") 12 of a vehicle 14. The carrier or rack 10 is designed to fit behind any vehicle with a 2 inch receiver, but it is anticipated that adapters may be provided to install the rack to vehicles by any of the other equivalent methods such as a one inch receiver or directly to the bumper or rear of a vehicle through well known methods.

Figure 2A:
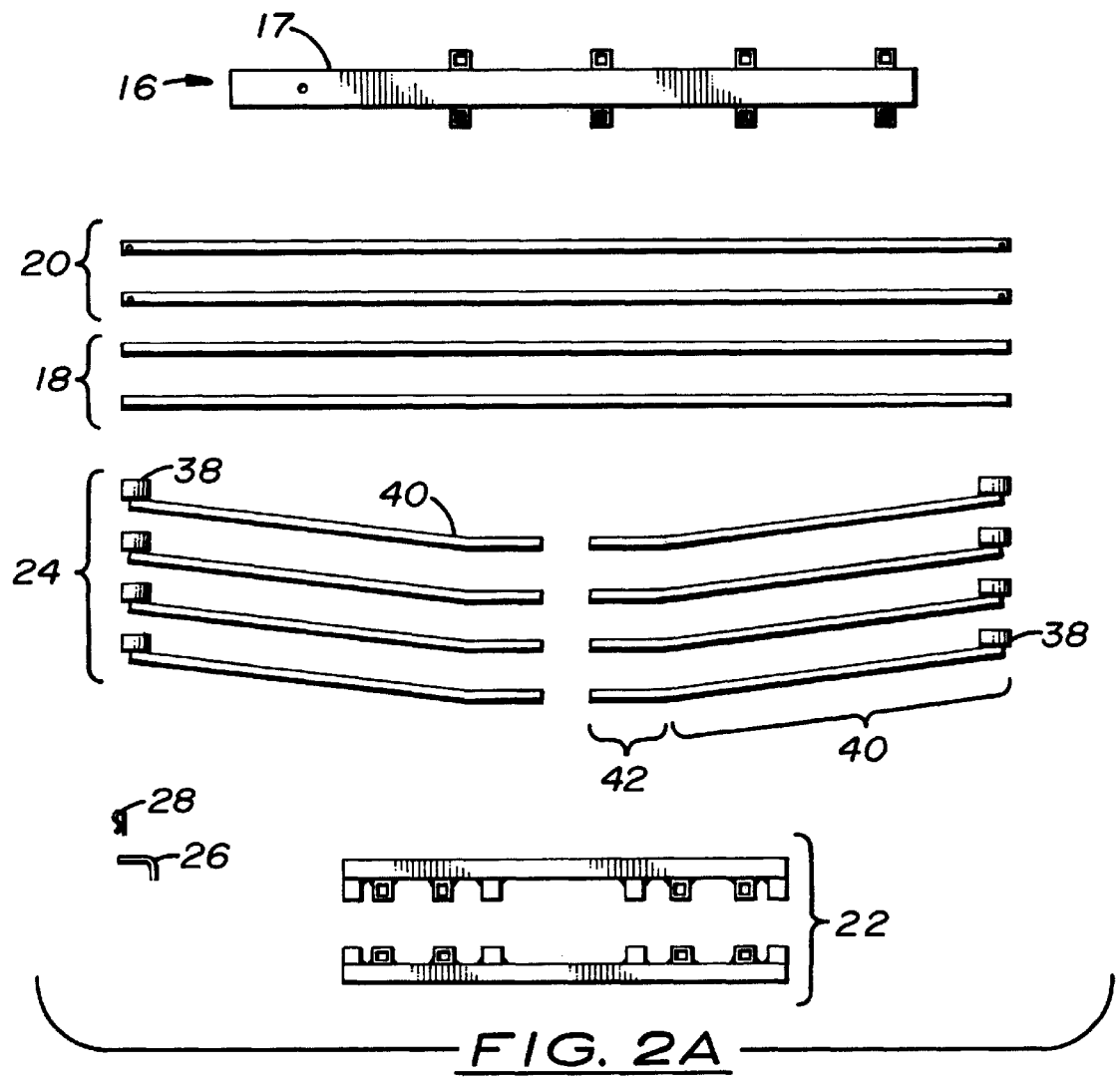
FIG. 2A is a plan view of the parts of the rack arranged prior to assembly or after disassembly.

FIG. 2A shows the pieces of the carrier 10 which can be assembled without the use of any tools to form the carrier 10. The carrier is formed by four basic units: a main support bar 16, four support rods 18, 20, eight braces 24, and two end pieces 22. In addition, a number of pins 26 and cooperating lock rings 28 are used to secure the pieces together.

Figure 2B:
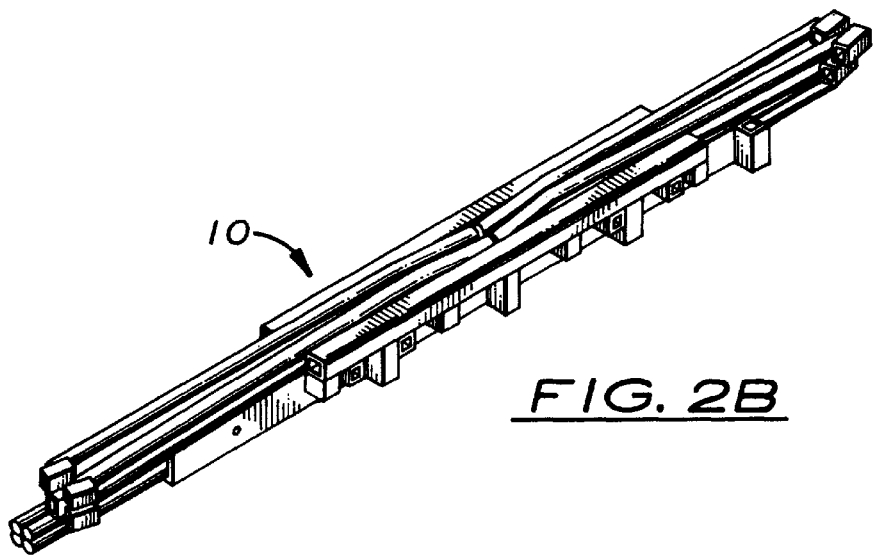
FIG. 2B is a perspective view of the rack components in their compact, stored state.
Figure 3A:
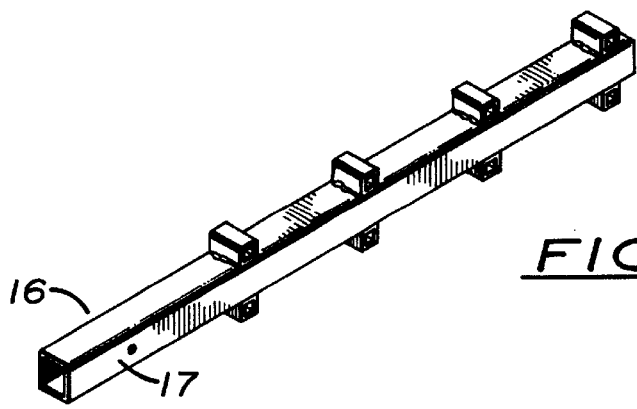
FIG. 3A is a perspective view of the main support bar.
Figure 3B:
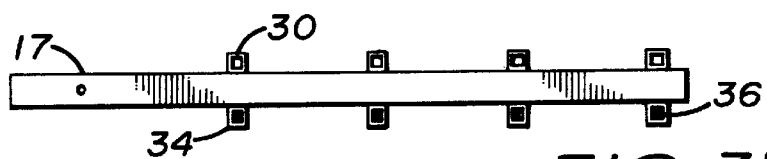
FIG. 3B is a side elevational view of the main support bar.
Figure 3C:
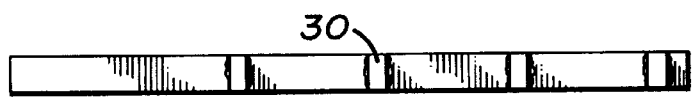
FIG. 3C is a top plan view of the main support bar.

As shown in FIG. 2B, for purposes of storage or compact transportation, the pieces are designed to fit within a case (not shown) which is 4 inches by 4 inches by 48 inches. The support rods 18,20 slide within the main support bar 16. The remaining pieces including the braces and end pieces are shorter than the support rods and can be arranged together to store within a conveniently small area.

The carrier can be stored in its unassembled form in a small area in the trunk, bed, or rear of a vehicle until needed. The carrier can then be rapidly assembled and deployed when needed without any tools or special equipment. Reference is made to FIGS. 1–5 as the assemblage of the carrier is explained.

The pieces of the carrier are removed from the case (not shown) in the bundle shown in FIG. 2B. The pieces are then laid out in groupings as shown in FIG. 2A. The base carrier is formed from a single main support bar 16 (FIGS. 3A–C), two inner support bars 18, two outer support bars 20, eight braces 24, and two end pieces 22. As shown in FIG. 4, the pieces of the rack are shown in various stages of assembly. The main support bar 16 is a rectangular bar sized having a receiver engaging end 17 to slide within the central channel of a standard receiver-type trailer hitch 12 of a vehicle 14. The carrier is fixed non-slidingly within the receiver by appropriate pins inserted through an eyelet provided in the receiver engaging end of the main support bar or by other well known means (not shown). The support bar 16 forms the is centerline of the carrier, with the portion of the carrier to the left of the bar being a mirror image of the right side. While the entire support bar is shown as having a constant width throughout its length, the bar could be formed of various no-rectangular shapes or have an expanded width for greater rigidity at points aft of the receiver engaging end section of the bar 16. But for the purposes of explanation only, the bar is shown with a constant, rectangular cross-section.

Along an upper portion of the main support bar there are provided four support rod brackets 30 for receiving the support rods 18,20. Along a lower portion of the main support bar are provide four brace stabilizing brackets 34. The stabilizing brackets 34 may be provided with a center flange dividing the bracket into two pockets, each of which receives a respective left or right brace 24.

The support rods 18,20 are divided into two categories, the inner two support rods 18 and the outer two support rods 20. The inner and outer support rods are identical except that the outer support rods have eyelets 32 for receiving pins 26, the purpose of which will be explained further below.

Figure 4A:
FIGS. 4A–D show a front elevational view of the support rods and braces being assembled onto the carrier.
Figure 4B:
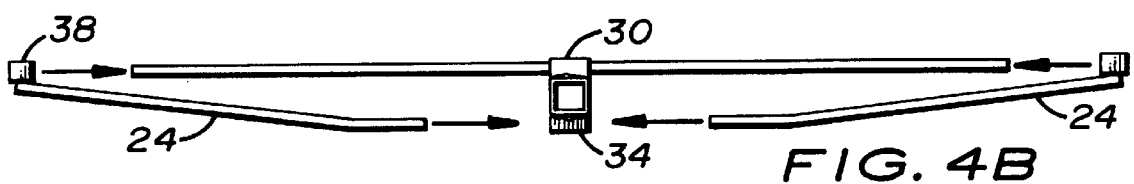
Figure 4C:
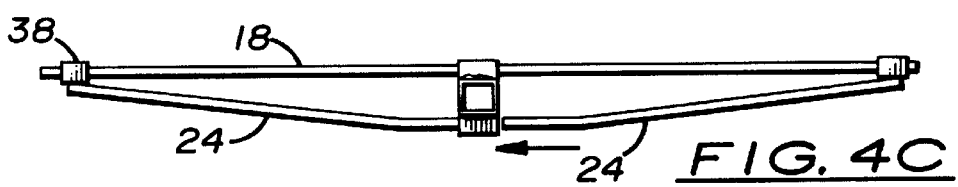
Figure 4D:
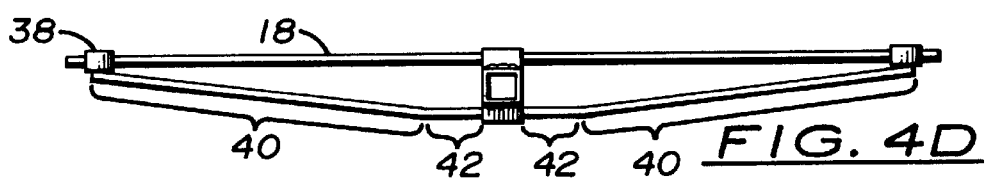

As shown in FIGS. 4A–D, the assembly of the support rod and braces on to the main support bar is shown. In FIG. 4A, the front most support rod bracket 26 is shown ready to receive an outer support rod 20. Once the bar has been centered in the bracket, braces 24 are slid over the support rod 18 as shown in FIGS. 4B–D. It should be noted that the support rods are free to slide within the bracket and will be fixed in position by the support braces 24 and end pieces 22.

The support braces 24 are formed by a brace main bracket 38 and a brace rod 40 (see FIGS. 2A & 4D). The brace rod is attached at its first end to the bracket 38 which is sized appropriately to slide over a support rod 18,20. The brace rod angles away from the bracket and bends into a second brace rod section 42 which is parallel to the axis of the brace bracket 38 such that the brace bracket of the brace is received on the support rod, the second section of the brace rod is angled to slide matingly into the stabilizing bracket pocket abutting the center flange 36 of the bracket 34 as shown in FIGS. 4B–D. One skilled in the art would recognize that instead of using a flange in the center of the brace stabilizing brackets 34, that the brace rods 40 and bracket 34 could be sized such that the brace rod could not pass through bracket or the rod could be held in place in the bracket by pins or other means known to one skilled in the art.

Once all of the braces are in place, the end pieces 22 are ready to be installed to complete the base carrier. The two end pieces are mirror images of each other to form a right and left end piece. Each end piece 22 has a through hole 43 at its outer most edge (away from the main support bar) aligned with the aft most outer support rod (farthest from the vehicle) to receive a supplemental brake light ("supplemental light assembly") 44 (see FIGS. 6 &7) as will be described further below. Each end piece 22 has four support rod end receiving brackets ("rod end brackets") 46 aligned with the support for receiving a respective end of a support rod. The rod end brackets 26, end pieces 22, support rods 18,20, and braces 24 are sized such that when the rod end brackets are slid over the support rod ends, the outer edge of the rod end brackets 46 contact the outer edge of the brace brackets 38 to fixedly center the support rods 18,20 about the main support bar 16. Eyelets ("rod end bracket eyelets") 48 provided in the rod end brackets are formed to align with the support rod eyelets 32 of the two outer support rods 20. Pins 26 are then inserted through the bracket eyelets 48 and support rods eyelets 32 to secure the end pieces 22 to the support rods 20 and thus to carrier 10. The assembly of these parts forms the basic carrier unit ready to transport cargo to the desired location. If desired, flexible cables such as bungie cords or other straps may be used to further secure the end pieces to the main support bar.

Figure 7:
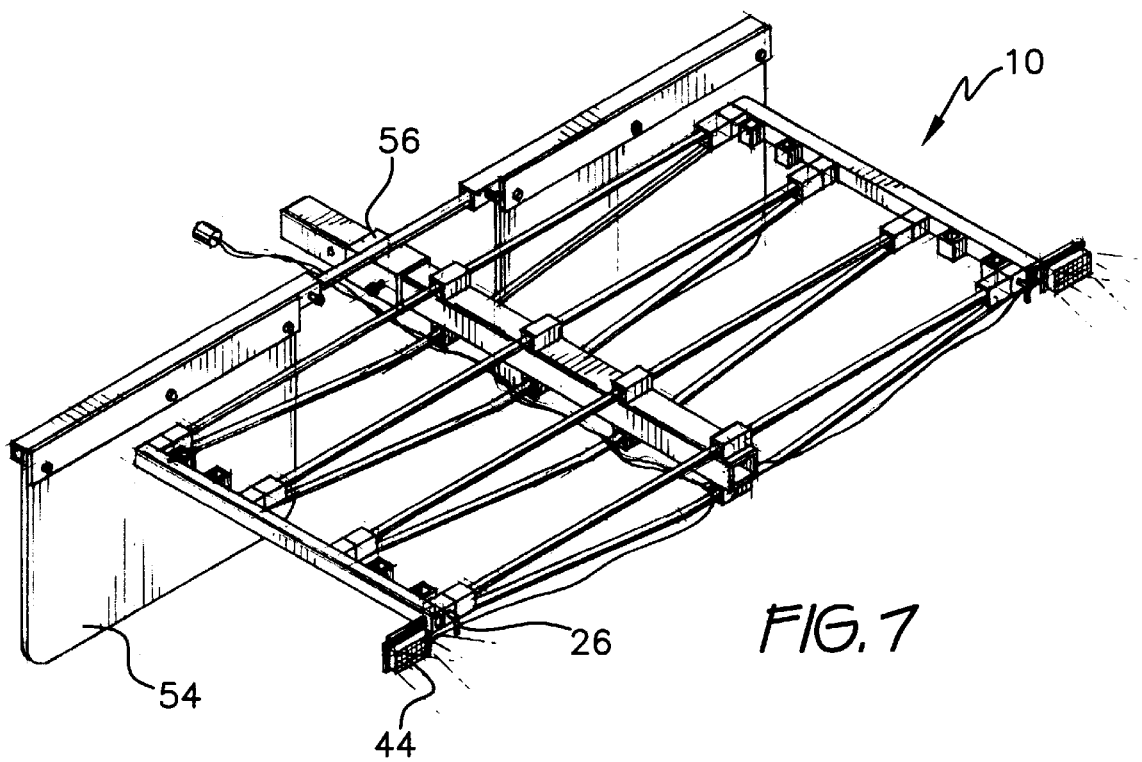
FIG. 7 is a perspective view of the carrier with the mud flaps and supplemental brake lights installed.
Figure 8:
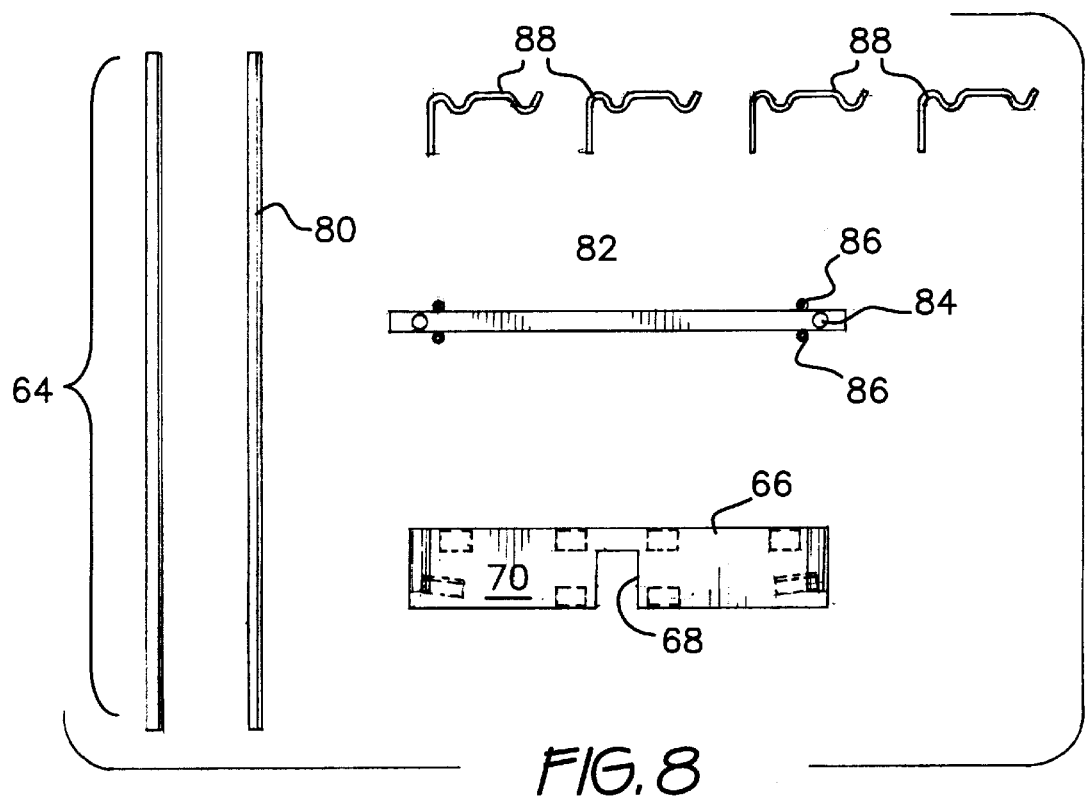
FIG. 8 is a plan view of the components of the bike carrier assembly according to a fourth embodiment of the invention.

In order to provide for the additional safety of the unit and to account for the brake lights and running lights which may be hidden or obscured by the cargo resting on the carrier, supplement brake or running lights may be secure to the carrier as described herein with reference to FIGS. 6B and 7. As previously described, each of the mirror image end pieces 22 have a through hole (lighting through hole") 43 aligned with the back most outer support rod 20. Supplemental lights 44 are provided with appropriate electrical connections 47 to which can be connected to an electrical outlet 48 carrier on the vehicle or hard wired into the brake light connections as is well known to one of ordinary skill in the art. Affixed to a rear portion of the light is a unshaped connecting rod ("light connecting rod") 50 having an eyelet 52 centered about one leg of the "U" and the other leg of the "U" welded or otherwise attached to the light 44. In operation, the pin 26 securing the end piece 22 to the back most support rod 20 is removed to unblock the lighting through hole 43 formed in the end piece 22. The free end of the light connecting rod 50 is inserted into the light through hole until the eyelet 52 of the light connecting rod 50 is aligned with the respective eyelets 32,48 of the rod end bracket 46 and the support rod 20. The pin 26 is then replace through the respective eyelets to secure the components to the carrier. In this way, no additional connecting pins are required to affix the supplemental lights to the carrier.

As shown in FIGS. 6A and 7, mud flaps 54 may also be secured to the carrier. A mud flap attachment 56 having a mud flap bracket 58 and two mud flap rods 60 permanently attached to the mud flap bracket 58 is insertable between the forward most outer support rod 20 and the receiver-engaging end 17 of the main support bar 16. The bracket 58 is sized to slide over the main support bar 16 receiver-engaging end and is pinned in place or otherwise secured along the main support bar 16 away from the vehicle and rearward from the wheels by bolt 55. A mud flap support rod 60 extends from each side of the mud flap bracket 58 orthogonal to the main support bar 6. Each mud flap 54 is provided with a mud flap support bracket 62 which is sized to slide along a respective mud flap rod 60. Each mud flap bracket 62 has a threadedly engaged screw or bolt 65 which is designed to frictionally engage the mud flap rod to secure the mud flap support bracket 62 and attendant mud flap 54 in place along the mud flap rod. In operation, the mud flap is positioned outwardly along the mud flap rod until the flap is properly positioned behind the vehicle wheel to prevent mud from being thrown by the wheel onto the cargo. The bolts may be provided with a flanged head or lever such that the bolt can be screwed tightly against the mud flap rod without requiring tools such as a screwdriver or a wrench maintaining the simple operation of assembly.

FIG. 11 shows a bicycle carrier option which may be installed onto the carrier. For the purposes of more clearly illustrating the assembly and operation of the carrier, the supplemental brake lights 44 (FIGS. 6 and 7) have been removed from the drawings, but it is to be understood that the lights can be installed in addition to the bike carrier option. As best shown in FIGS. 8–12, the installation of the bicycle carrier assembly 64 is installed in a manner similar to the basic carrier unit. It is necessary to remove the end pieces 22 by reversing the steps of assembly, namely by removing the pins 26 securing the end pieces 22 to the outer support rods 20 and sliding the end pieces away from the carrier. The aft most support bar 20 (farthest from the vehicle) must be removed by sliding it outwardly away from the support rod bracket 30.

The central attachment for the bike carrier option 64 is the bike carrier frame bracket ("frame bracket") 66 as best shown in FIGS. 8A & B. The frame bracket 66 is generally a flat rectangular plate with a rectangular cutout 68 removed from the bracket to slide over the main support bar. The frame bracket 66 has a first side 70 that is generally flat and faces aft (outwardly from the carrier) to present a smooth finish to a person viewing the carrier 10 from the rear. On the opposite side ("connector side") 72 of the frame bracket are attached a number of connecting points for securing the bracket 66 to the carrier and for securing the bike carrier assembly 64 to the frame bracket 66.

Referring again to FIGS. 8A & B, the frame bracket has on its connector side a number of individual brackets for receiving components of the carrier and bike carrier assembly. Across the top of the connector side of the frame bracket are four spaced apart carrier brackets 74 for receiving the outer support rod 20. Below the carrier brackets and having parallel axes to the carrier brackets are the brace rod brackets 76 for receiving the brace rods therethrough. The brace rod brackets are positioned on either side of the cutout at a lower edge of the frame bracket 66. The outermost bracket may consist of one bracing wall as best shown in FIGS. 9–10 to accommodate the bend between sections 40 and 42 of the brace, while effectively securing the frame bracket in place.

In operation, as shown in FIGS. 10–12, with the outer support rod 20 removed from the rack, the frame bracket 66 is slid vertically downward onto the main support bar 16 with the smooth face 70 facing away from the vehicle. The support rod 20 is then replaced by sliding the rod through the carrier brackets 74 and the support rod bracket until centered about the main support bar 16. The support braces 24 and then replaced in a similar manner as described above with the additional step of inserting the brace rod second sections 42 though the brace rod brackets to secure the bike carrier frame bracket 66 to the carrier 10.

Two additional brackets ("support beam brackets") 78 are positioned on the frame bracket for receiving the vertical support beams ("support beams") of the bike carrier assembly. The brackets are formed with an opening at the upper end for receiving the ends of the support beams, and four vertical sides for securing the support beam, and a lower wall for abutting against the end of the support beam. The support beam can thus be slid downwardly into the support beam bracket until the bottom of the support beam is adjacent the lower wall of the support beam bracket. A pin and cooperating eyelets in the bracket and support beam can be used to secure the support beam inside the bracket in a manner as described above.

With both support beams 80 thus secured in the support beam bracket, the horizontal cross beam ("cross beam") 82 is ready to be positioned on top of the support beams 80. The cross beam has two downwardly facing brackets ("cross beam brackets") 84 formed in said cross beam having opening about its lower face to receive the upper ends of the support beams 80. The cross beam can thus be slid over the top of the support beams 80 by inserting the support beams into the cross beam brackets until the top of the support beams abuts the top wall of the cross beam bracket 84. If desired, a tie down strap 89 or other securing device can be used to further secure the cross beam and bike carrier assembly to the carrier.

Figure 12A:
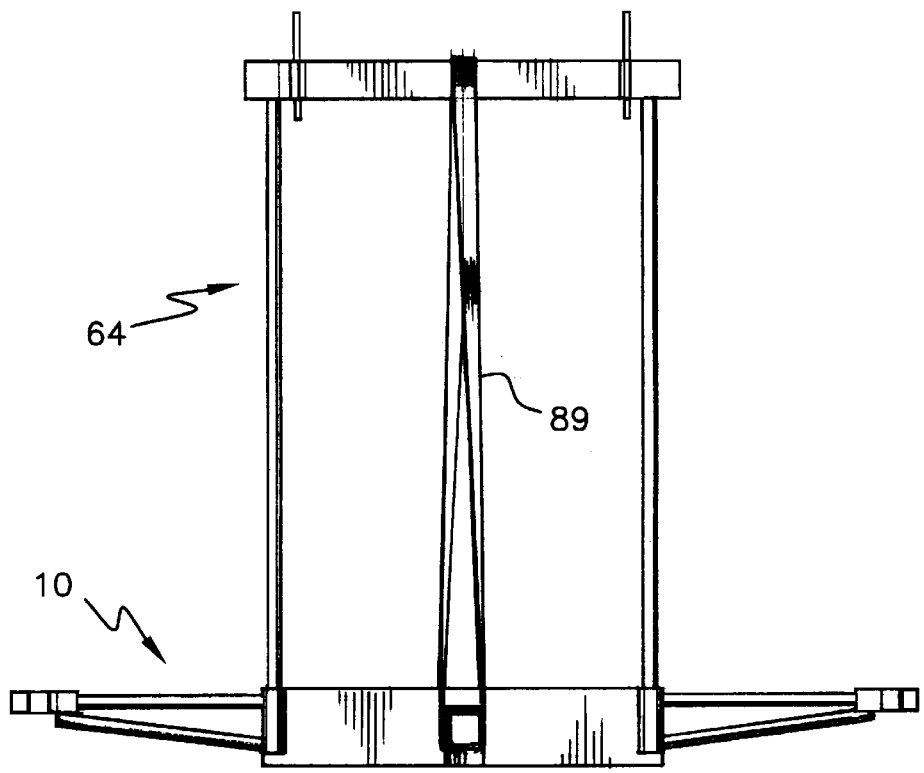
FIGS. 12A & B are front plan views of the assembled bike carrier assembly.
Figure 12B:
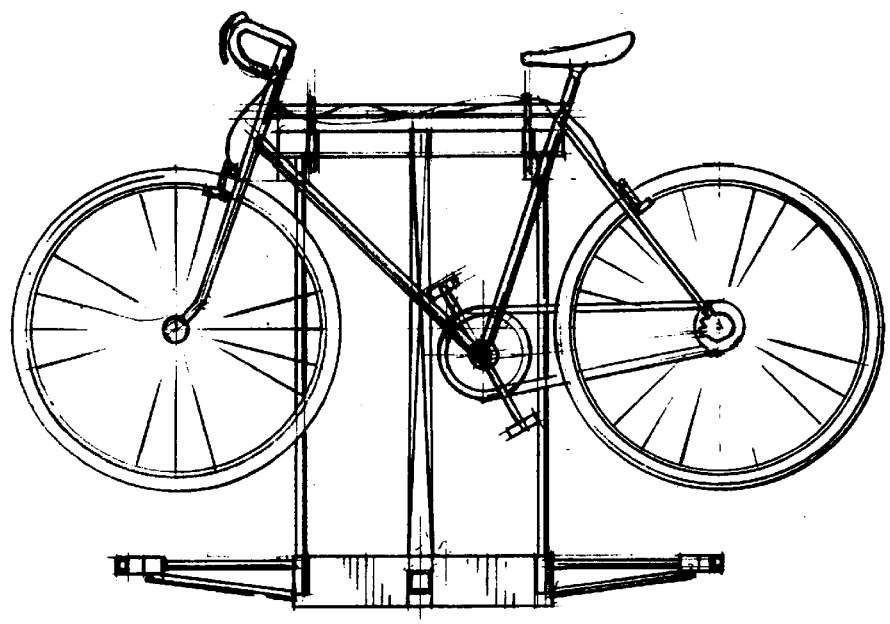

The horizontal cross beam 82 as four bike brackets 86 mounted with two on each of the opposite sides of the cross beam. The bike brackets 86 each have an upper opening for receiving a bike holder 88 as shown in FIGS. 12A & B. The bike holders 88 are designed to carry one or more bikes by the top tube of the bike frame. The bike carrier assembly 64 can thus carry 1 to 4 bikes in addition to cargo on the carrier itself, with FIG. 12B showing one such bike positioned on the carrier.

Figure 13:
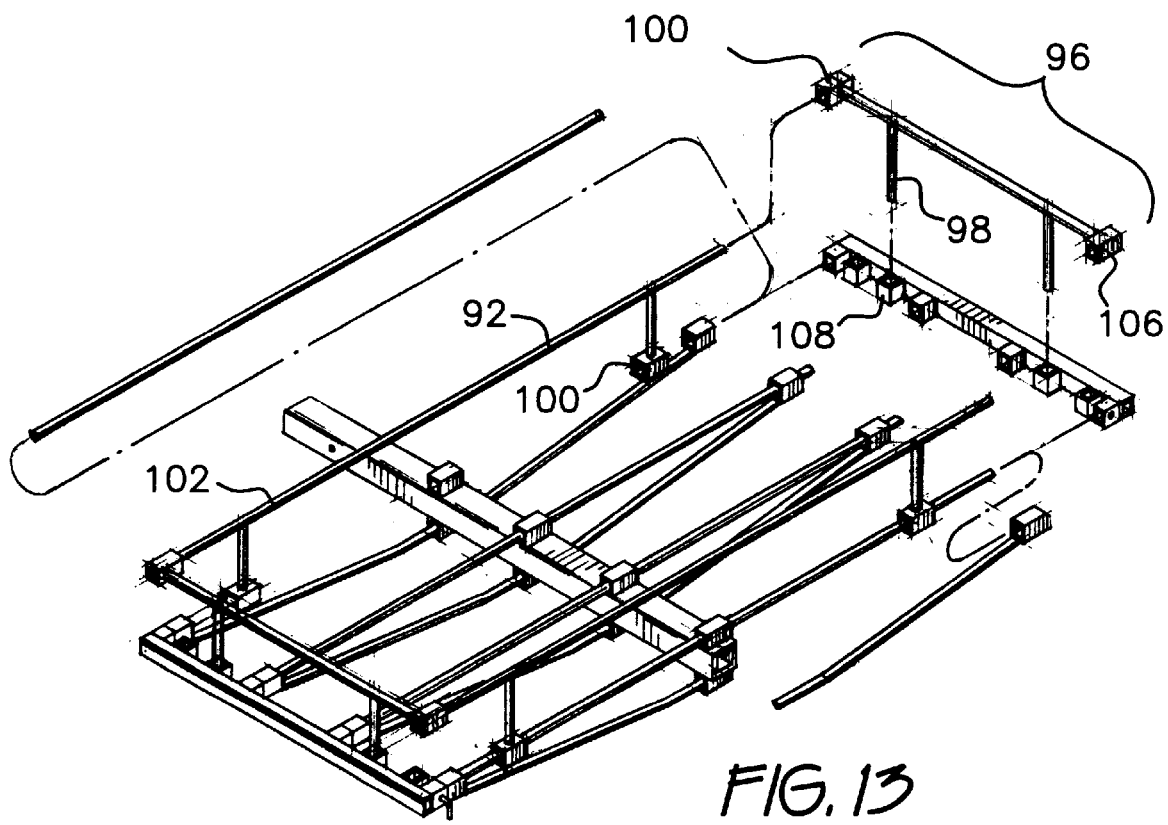
FIG. 13 is an exploded view of the components of the railings in partial assembly according to a fifth embodiment of the invention.
Figure 14:
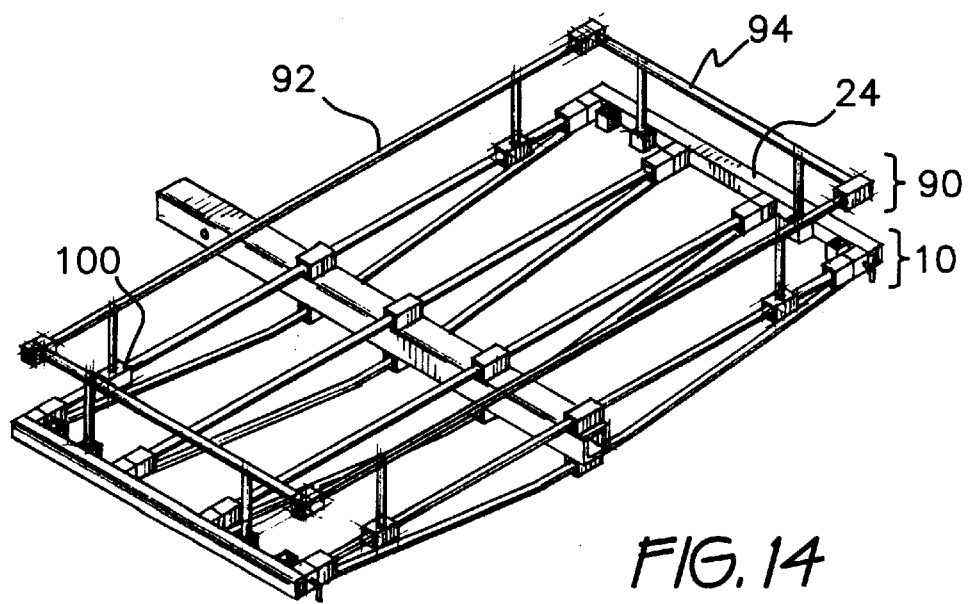
FIG. 14 is a perspective view of the railings assembled to the carrier.

To add further security and adaptability to the carrier, railings 90 can be added to the carrier as shown in FIGS. 5, 13 and 14 to provide a perimeter about the carrier to prevent cargo from sliding out of the carrier. The railing consists of two side walls 92 at the front and back of the carrier and two end walls 94 (above each end rail 22). The side walls are formed by a horizontal cross bar ("cross bar") 96 and two lower support legs 98 spaced about the cross bar. Attached to a lower end of each support leg is a cross bar bracket 100 sized to fit about a outer support rod 20. The installation of which will be discussed below. The end walls 94 are each formed by an end cross bar 102 also having end support legs 104 spaced about the cross bar for supporting the cross bar at a sufficient height above the carrier. Unlike the support legs of the side walls, there are no brackets on the bottom of the end support legs. In addition, the ends of the end cross bar 102 have corner brackets 106 for receiving the ends of side cross bars 96 as will hereinafter be explained.

The end pieces 22 are each provide with two upwardly opening end wall brackets ("end wall brackets") 108. Each bracket is located between an outer support rod bracket and an inner support rod bracket, but the location of each could be changed depending on the number of support legs needed, etc.

In operation, the pins must be removed from the end pieces 22 and from the outer support rods 20, to allow the end pieces 22 and outer support rods to be removed. Once the outer support rods are removed from the carrier, a side wall is held in place such that the cross bar brackets 100 of the respective side wall support legs is co-linear with the axis of the respective support rod bracket 30. The outer support rod for the particular side is then replace through the cross bar brackets and the support rod bracket to secure the side wall 92 to the carrier. At this point, the side wall can be rotated about the support rod until the securing end walls are placed in position.

After securing the second side wall 92 in place in a similar fashion to the first side wall, the end walls should be installed to secure the railings fixedly to the carrier 10. The end wall support legs 104 are sized to fit within the end wall brackets of the end pieces, and must be inserted into the end wall brackets 108 before replacing the end pieces 22 onto the support rods 20. With the support legs pinned in place in a manner similar to that described above, the final assembly is ready to be made. Holding the end walls in their final vertical position, one end wall and end piece are slid inwardly to engage the support rods 18,20 (at the support rod brackets 30) and to engage the end cross bars (at the corner brackets), the end piece may secured in place through the pins and lock rings as described above. In a similar manner the second end piece 22 can be slid from the other side to engage the support rod and end walls from the opposite side and pinned into place. The carrier is now provided with secured railings to further secure the cargo onto the carrier.

A further embodiment of the invention is the picnic table embodiment as shown in FIGS. 15 and 16. Four table legs 110 are provided having a lower base, preferably covered with a rubber boot 112 or other ground engaging surface. The upper end of each leg has a flange permanently secured to the leg to engage the bottom of bracket 116 carried on an end piece 22. The bracket 116 may be a lower portion of the end wall brackets or provide in a separate area closer to the extremity of the end wall bracket to provide enhanced stability. When the table leg 110 is inserted into the bracket, the leg can only extend through the bracket until the wide face of the flange 114 engages a lower wall of the bracket 116. With the four legs secured in four respective brackets, the carrier can be supported at a predetermined height above the ground or floor on which the table legs are resting. The carrier can thus serve as a table when the vehicle is in a remote location.

It is to be understood that the present invention is not limited to the sole embodiment described above, but encompasses any and all embodiments within the scope of the following claims. One skilled in the art would appreciate that endless other options could be provided onto the carrier as described above without straying from the principal operation of the carrier.

I claim:

1. A cargo carrier for attachment to a rear portion of a vehicle, comprising:

a main support bar, a plurality of support rods, a plurality of braces, and a left and right opposing end piece;

said main support bar having an elongate body having a top portion, a bottom portion and a side portion;

said support bar top portion having a plurality of spaced apart support rod brackets for slidably receiving a respective one of said plurality of support rods therethrough to fix said respective support rod in place;

said support bar bottom portion having a plurality of spaced apart brace stabilizing brackets for receiving a respective pair of said plurality of braces therein;

each of said plurality of braces having a rod section dimensioned to be received within a respective one of said plurality of brace stabilizing brackets, and a brace main bracket for receiving a portion of a respective one of said plurality of support rods therethrough for stabilizing said respective support rod; each of said left and right end pieces having a plurality of end brackets for receiving a respective end section of one of said plurality of support rods therein for non-slidingly securing each of said plurality of support rods;

whereby said cargo carrier forms a platform for transporting cargo behind the vehicle.

2. A cargo carrier according to claim 1, having a disassembled state wherein said plurality of support rods, said plurality of braces, and said left and right opposing end pieces, are positioned next to and parallel to said main support bar to form a packed condition occupying a space less than 5 inches by 5 inches by 50 inches.

3. A cargo carrier according to claim 2, wherein said packed condition occupies a space 4 inches by 4 inches by 48 inches.

4. A cargo carrier for attachment to a rear portion of a vehicle via a receiver-type trailer hitch of the type having a substantially square tubular configuration with an open central channel, comprising:

a main support bar, four support rods, four pairs of braces, and two end pieces;

said main support bar having an elongate body having a top portion, a bottom portion and a side portion, said support bar further having an outer dimension substantially equivalent to an inner dimension of the receiver hitch central channel for being received within the receiver hitch channel to attach said cargo carrier to the vehicle;

said support bar top portion having four spaced apart support rod brackets for slidably receiving a respective one of said four support rods therethrough to fix said respective support rod in place;

said support bar bottom portion having four spaced apart brace stabilizing brackets for receiving a respective pair of said four pairs of braces therein;

each of said four support rods having a longitudinal axis perpendicular to a longitudinal axis of said main support bar, a central portion and opposing end sections;

each of said four pairs of braces having a rod section dimensioned to be received within a respective one of said four brace stabilizing brackets, and a brace main bracket for receiving a portion of a respective one of said four support rods therethrough for stabilizing said respective support rod;

a left and right end piece, each of said end pieces having four rod end brackets for receiving a respective end section of one of said four support rod therein for non-slidingly securing said four support rods;

whereby said cargo carrier forms a platform for transporting cargo behind the vehicle.

5. The cargo carrier according to claim 4, further including a bike carrier assembly for carrying at least one bicycle.

6. The cargo carrier according to claim 5, wherein said bike carrier assembly includes:

a frame bracket selectively mountable to said main support bar;

a pair of support beams extending upwardly from said frame bracket;

a cross beam attached to an upper portion of said pair of support beams; and a plurality of bike carrier brackets for receiving at least one bicycle thereon.

7. The cargo carrier according to claim 6, wherein said frame bracket includes a plurality of carrier brackets for receiving said support rods therethrough to secure said frame bracket to said main support bar.

8. The cargo carrier according to claim 7, wherein said frame bracket further includes a plurality of brace rod brackets for non-rotatingly securing said frame bracket to said main support bar.

9. The cargo carrier according to claim 4, further means defining a through hole for selectively receiving a light connecting rod of a supplemental light assembly therethrough for providing supplemental lighting to said cargo carrier;

said supplemental light assembly further including electrical connecting means for connecting said supplemental light assembly to an electrical system of the vehicle.

10. The cargo carrier according to claim 9, wherein said supplemental light assembly is a brake light.

11. The cargo carrier according to claim 4, further including a mud flap assembly having a mud flap bracket, a mud flap rod, and a plurality of mud flaps, wherein said mud flap bracket is dimensioned to be received over a forward portion of said main support bar, said mud flap rod is attached to said mud flap bracket to extend perpendicular to a longitudinal axis of said main support rod in a generally horizontal plane, and said mud flaps are attached to said mud flaps to suspend therefrom to block debris thrown from tires on the vehicle.

12. The cargo carrier according to claim 4, further having railings.

13. The cargo carrier according to claim 4, further having a pair of end walls joined to a pair of side walls to form railings extending upwardly from said cargo carrier to secure cargo on said carrier.

14. The cargo carrier according to claim 4, having four table legs selectively mountable to said cargo carrier to form a picnic table.

15. A method of assembling a bike carrier for attachment to a vehicle, including the steps of:

(a) providing a main support bar having
  (i) an elongate body having a top portion, a bottom portion and a side portion, said support bar further having an outer dimension substantially equivalent to an inner dimension of the receiver hitch central channel for being received within the receiver hitch channel to attach said cargo carrier to the vehicle;
  (ii) said support bar top portion having four spaced apart support rod brackets, each of said support rod brackets having means defining a through hole substantially perpendicular to an elongate axis of said main support bar;
  (iii) said support bar bottom portion having four spaced apart brace stabilizing brackets, each of said brackets having means defining a through hole substantially perpendicular to an elongate axis of said main support bar;

(b) providing four support rods having a central portion and opposing end sections;

(c) providing four pairs of braces having a rod section dimensioned to be received within a respective one of said four brace stabilizing brackets, and a brace main bracket;

(d) providing a left and right end piece, each of said end pieces having four rod end brackets for receiving a respective end section of one of said four support rod therein for non-slidingly securing said four support rods;

whereby said cargo carrier forms a platform for transporting cargo behind the vehicle.

* * * * *